US006859668B1

(12) United States Patent
Ginzburg et al.

(10) Patent No.: US 6,859,668 B1
(45) Date of Patent: Feb. 22, 2005

(54) STRUCTURED SYSTEM FOR MONITORING AND CONTROLLING THE ENGINEERING EQUIPMENT OF AN INSTALLATION

(75) Inventors: Vitaliy Veniaminovich Ginzburg, Moscow (RU); Viktor Aleksandrovich Burmistrov, Moscow (RU); Aleksandr Vasilevich Fabrichnev, Moscow (RU); Vladimir Vladimirovich Ershov, Moscow (RU)

(73) Assignee: EcoProg Ltd., Moscow (RU)

( * ) Notice: Subject to any disclaimer, the term of this patent is extended or adjusted under 35 U.S.C. 154(b) by 0 days.

(21) Appl. No.: 09/787,483
(22) PCT Filed: Sep. 20, 1999
(86) PCT No.: PCT/RU99/00342
§ 371 (c)(1),
(2), (4) Date: Mar. 19, 2001
(87) PCT Pub. No.: WO00/17718
PCT Pub. Date: Mar. 30, 2000

(30) Foreign Application Priority Data

Sep. 21, 1998 (RU) ............................................. 98117308

(51) Int. Cl.$^7$ ............................................. G05B 15/02
(52) U.S. Cl. ............................... 700/19; 700/9; 700/22; 710/110; 725/79
(58) Field of Search ............................ 700/19, 20, 21, 700/22, 9; 710/110; 725/79; 340/310.01

(56) References Cited

U.S. PATENT DOCUMENTS

| | | | | |
|---|---|---|---|---|
| 4,319,338 A | * | 3/1982 | Grudowski et al. | 710/109 |
| 4,964,058 A | * | 10/1990 | Brown, Jr. | 700/296 |
| 5,475,625 A | | 12/1995 | Glaschick | |
| 5,615,104 A | | 3/1997 | Takai et al. | |
| 5,684,374 A | | 11/1997 | Chaffee | |
| 5,696,495 A | * | 12/1997 | Pietzsch et al. | 370/235 |
| 6,059,439 A | * | 5/2000 | Besnard | 700/9 |
| 6,208,904 B1 | * | 3/2001 | Mullen, Jr. | 700/9 |
| 6,405,103 B1 | * | 6/2002 | Ryan et al. | 700/275 |

FOREIGN PATENT DOCUMENTS

| | | |
|---|---|---|
| DE | 4125839 A1 | 2/1993 |
| RU | 2106674 | 3/1998 |
| WO | WO 94/18630 | 8/1994 |
| WO | WO 95/05609 | 2/1995 |

* cited by examiner

Primary Examiner—Emanuel Todd Voeltz
(74) Attorney, Agent, or Firm—Lackenback Siegel LLP

(57) ABSTRACT

The present inventions pertains to the field of automatic control systems based on computer technology, and essentially relates to a structured system for monitoring and controlling the engineering equipment in an installation, mainly a building comprising several floors. The system includes a central computer module with an input-output device as well as a plurality of monitoring and/or measuring and/or control sensors and/or control devices for the units and apparatus of the engineering equipment in the building. The module consists of a programmable computer server station having functions, according to the software, that provide for the centralized reception of monitoring data through information channels within a single network protocol, as well as for the processing of said data and for the output of control signals towards the control devices for the units and apparatus of the engineering equipment in the building. This system further includes controllers connected in a "star" circuit to the input-output device of the central computer module. Each controller has a plurality of remote input-output modules connected serially thereto, while each of said modules has a corresponding sensor or a control device connected thereto. At least one additional computer station is connected through its input-output module to the corresponding controller that ensures, according to the software, the local monitoring and the control of the units and apparatus in at least one functionally independent section of the engineering equipment in the building.

12 Claims, 1 Drawing Sheet

US 6,859,668 B1

STRUCTURED SYSTEM FOR MONITORING AND CONTROLLING THE ENGINEERING EQUIPMENT OF AN INSTALLATION

This application claims priority of Russian Application No. 98117308 filed Sep. 21, 1998 and international Application No. PCT/RU99/00342 filed Sep. 20, 1999, the complete disclosure of which is hereby incorporated by reference.

FIELD OF THE INVENTION

The present invention relates to the art of automatic control systems based on computer technology and, more specifically, to the design of a system for monitoring and measuring the operational parameters of and controlling the life-support engineering equipment, mainly of an intellectual type, of a building.

DESCRIPTION OF THE PRIOR ART

Traditional solutions presuppose automation of local engineering systems of an installation rather than taking an integrated approach to the automation of said installation as a whole. Presently, large installations are equipped with a plurality of different engineering systems to support the life of such installations and the technological processes of the organizations located therein. The number of such systems is growing by the year, and so does the scope of the equipment thereof. To-day, these systems and the means of monitoring the condition thereof are developing extensively—the monitoring of engineering systems is performed by methods specific for each individual system and relies on the use of cable networks as a communication media that links separate elements in of an engineering system with a control station. Many engineering systems are even totally devoid of any means of monitoring—centralized supervision, measurement and control. Each such monitoring sub-system performs limited local tasks of the automation and manual supervision of an existing engineering system. Analysis of existing systems indicates that to a greater or lesser degree such solutions have the following drawbacks in common: shortage of information for the maintenance services; lack of coordination between monitoring elements of various engineering systems; poor overall reliability of technological processes; use of morally outdated hardware; lack of unification of the equipment and cabling; lack of readily available spare equipment; high operational costs; slow reaction to failures of the equipment and restoration of the serviceability thereof; absence of engineering solutions to ensure sustained functioning of the system; lack of automatic control functionality; limited dispatch capabilities due to the absence of means for remote transmission of information to the maintenance services of the building.

In buildings with a well-developed infrastructure, complex and expensive engineering and utility systems are functioning. Proper supervision and control of the engineering equipment of these buildings are one of the preconditions essential for ensuring sustained functioning and efficient use of the life-supporting infrastructure of such buildings. However, the existing dispatch systems of buildings do not provide for the supervision of said engineering equipment in sufficient scope, are usually built with the use of components that have poor reliability, and do not offer the capability of analyzing the condition of said equipment or prognosticating failures thereof.

The above-listed shortcomings can be eliminated by applying the technique of constructing a structured system for monitoring and controlling the engineering equipment of an installation. The main principles of such a technique are as follows: use of a common structured cable network within the installation; creation of a hierarchically structured control and information gathering system; concentration of information and distribution thereof according to the needs and levels of authority; integrated automation of information accounting and processing functions; integration with higher-level automatic management, control and information systems in the capacity of an information-supplying agent; use of engineering system equipment with a built-in monitoring and control functionality; unification of equipment and informational support; standardization of design solutions.

Because engineering systems of a building are interrelated, with the condition of one engineering system affecting that of another engineering system, the superintendent of such a building and administrator of the maintenance service department thereof must have adequate information on the related engineering systems. Information on the status and condition of engineering systems is also necessary for the administrators of the local area network and other information systems in the building, including those representing the core processes of various organizations located therein. The structuring of information flows within the system makes it possible to lower requirements to the throughput capacity of information transmission channels and enter the management infrastructure of the building and organizations located therein in a most efficient way.

The hierarchical structure of information gathering and management within the monitoring and control system makes it possible to integrate such structured monitoring and control system with other automated supervision and information systems making part of situational centers of various levels.

Integrated automation of information accounting and processing makes it possible to preclude human errors and improve overall functional reliability of engineering systems.

The use of equipment with a built-in monitoring and control functionality within engineering systems makes it possible to simplify the creation of monitoring and management systems, obtain comprehensive information on such equipment, and make diagnostics thereof easier.

Unification of the monitoring equipment makes it possible to reduce maintenance costs and shorten serviceability restoration time.

The prior art knows a system for monitoring and controlling active engineering equipment built around a central computer module with an input-output device to which a plurality of monitoring and/or measuring and/or control sensors and control devices for the units and apparatus of the active engineering equipment in the building is linked via channels of an information network. The module consists of a programmable computer server station having functions, according to the software, that provide for the centralized so acquisition of monitoring data through information channels within a single network protocol, as well as for the processing of said data and for the output of control signals to the control devices for the units and apparatus of the engineering equipment in the building (ref. U.S. Pat. No. 5,684,374, G05 13/00, published 04.11.97).

A specific feature of such a system is that all monitoring and control sensors and control devices thereof are linked directly to the input-output controller of the computer server station, which is the sole central controller. Such a system is justifiable for offices or buildings with a relatively small floor area, in which said sensors or devices are located in immediate proximity to the controller. In situations where the sensors are located at considerable distances from the controller, long cables have to be laid, which is not always justifiable economically. In the case of a high-rise building heavily saturated with a variety of engineering equipment, such a scheme for monitoring and controlling said equipment leads to an excessive complexity of the scheme proper, makes it difficult to lay and debug, lowers throughput capacity, and results in the lack of support software with which these deficiencies can be eliminated.

The prior art also knows another structured system for monitoring and controlling the engineering equipment of an installation, mainly a building comprising several floors. The system includes a central computer module with an input-output device to which a plurality of monitoring and/or measuring and/or control sensors and control devices for the units and apparatus of the engineering equipment in the building are linked via channels of an information network. The module consists of a programmable computer server station having functions, according to the software, that provide for the centralized acquisition of monitoring data through information channels within a single network protocol, as well as for the processing of said data and for the output of control signals to the control devices for the units and apparatus of the active engineering equipment in the building (ref. DE, Application No. 4125839, GOSB 15|00, published 04.02.93).

The system has the same disadvantages as those described earlier. Designed for use in buildings, this system takes no account of the remoteness of the input-output device of the central programmable server from the location of the sensors or control devices for the units and apparatus of the engineering equipment. In such a system, for instance, the maximum distance from a sensor to the controller is limited to 250 meters, even if high-quality network cables of type AN&T SYSTIMAX®SCS (designed by Lucent Technologies) are used. Only within such a distance a sufficiently broad bandwidth can be attained to permit the transmission of data at a rate of 622 bit/s at low cost and a short radiation wavelength (850 nm) and a rate of 2.5 Gbit/s with the use of transmitters with a longer wavelength (1300 nm). Practice shows that for an error-free and reliable transmission of data, best results are achieved over distances no longer than 100 m, which is the established standard. At longer distances this scheme fails to produce the required result as regards the efficiency, quality and accuracy of the functioning of the monitoring and control system.

At present, network-based monitoring and control systems are required to transmit not only digital (text) data, but also voice and video information. For this purpose, corresponding broadband applications have been developed, including multimedia and full-scale digital video conferencing applications. For these applications to be used, the transmission speeds and the volume of traffic in the local and global networks need be increased considerably. In order to be able to support the transmission complex digital signals at high speeds the network cables should naturally be designed so as to preclude signal loss therein.

Practice shows that with appropriate hardware and software support these complex signals can be transmitted with the required accuracy and speed over cable sections with a length of up to 100 m. Consequently, for buildings with a large floor area and multi-functional engineering equipment distributed all over that area the scheme of a system for monitoring and controlling said equipment has, as far as the arrangement and placement of the components thereof are concerned, to be subordinated to the requirement of keeping the individual sections of the network cable to within the maximum allowable length.

DISCLOSURE OF THE INVENTION

It is an object of the present invention to solve the engineering task of eliminating the afore-mentioned drawbacks and creating such a structured system for monitoring and controlling the engineering equipment in an installation, mainly in a building comprising several floors, that would use a cable network the length of whose individual sections is limited by the relevant standard and still provide for complete monitoring and reliable centralized control and management all life-supporting engineering systems in a building with a large floor area, a large number of floors and a developed multi-functional equipment complexes. The engineering result achieved consists in an improvement of the performance characteristics and efficiency of the monitoring and control system, and thus an improvement of the overall reliability of the functioning of the engineering systems in the building.

This engineering result is achieved through the use of a structured system for monitoring and controlling the engineering equipment in an installation, mainly a building comprising several floors. This system includes a central computer module with an input-output device as well as a plurality of monitoring and/or measurement and/or control sensors and/or control devices for the units and apparatus of the engineering equipment in the building. The module consists of a programmable computer server station having functions, according to the software, that provide for the centralized acquisition of monitoring data through information channels within a single network protocol, as well as for the processing of said data and for the output of control signals to the control devices for the units and apparatus of the engineering equipment in the building. This system further includes controllers connected in a star circuit to the input-output device of the central computer module. Each controller has a plurality of remote input-output modules serially connected thereto, while each of said modules is linked to a corresponding monitoring and/or measuring and/or control sensor and/or device for controlling a specific unit or apparatus of the engineering equipment in the building. There is also at least one additional computer station connected through its input-output module to the corresponding controller to ensure, according to the software, the local monitoring and the control of the units and apparatus in at least one functionally independent section of the engineering equipment in the building.

Each such controller has remote input-output modules connected thereto, which are in turn linked to said sensors or control devices related to the units and apparatus of at least one functionally independent section of the engineering equipment in the building. The functionally independent section of the engineering equipment in the building includes units and apparatus of the lift equipment, or pump equipment, or heat supply station, or electric power supply system of the building.

The sensors and control devices that put out information-carrying signals in a format other than that of the common network protocol are connected to the appropriate controller via a data converter designed to convert data of one network protocol into data of another network protocol.

The system is connected to a plurality of uninterrupted power supplies, which ensures survivability of the system against possible power outages.

The controllers can be positioned at the points of location of the communications hubs that link the engineering equipment in the building to the common electric power supply system.

The functions of the monitoring and measuring sensors can be performed by level, flow, temperature and pressure sensors, respectively, while infrared sensors, photosensors and heat sensors can be used as the control sensors.

The control devices are servo drives or drives having the function of performing an action in response to the signal from a sensor. These devices can be represented by apparatus for controlling the position of window blinds or window leafs, devices for remote opening/closing of doors or on/off switching of lights.

The above-mentioned features are material, are interrelated with one another, and form a stable combination of material features sufficient to obtain the requisite engineering result.

Thus, connection of the controllers to the input-output device of the central computer module in a hierarchical star circuit makes it possible, even with the use of cable sections of a limited length, to ensure a constancy of signal parameters during the transmission thereof over these sections while preserving the scheme of communication between the central module and the remote input-output modules to which the sensors and control devices are connected. It also becomes possible to place each such controller in the communications hub on a separate floor and use additional cabling to provide a link to the equipment available on said floor.

BRIEF DESCRIPTION OF THE DRAWINGS

The invention will now be described with reference to the accompanying drawing.

BEST MODE OF CARRYING OUT THE INVENTION

Figure 1:
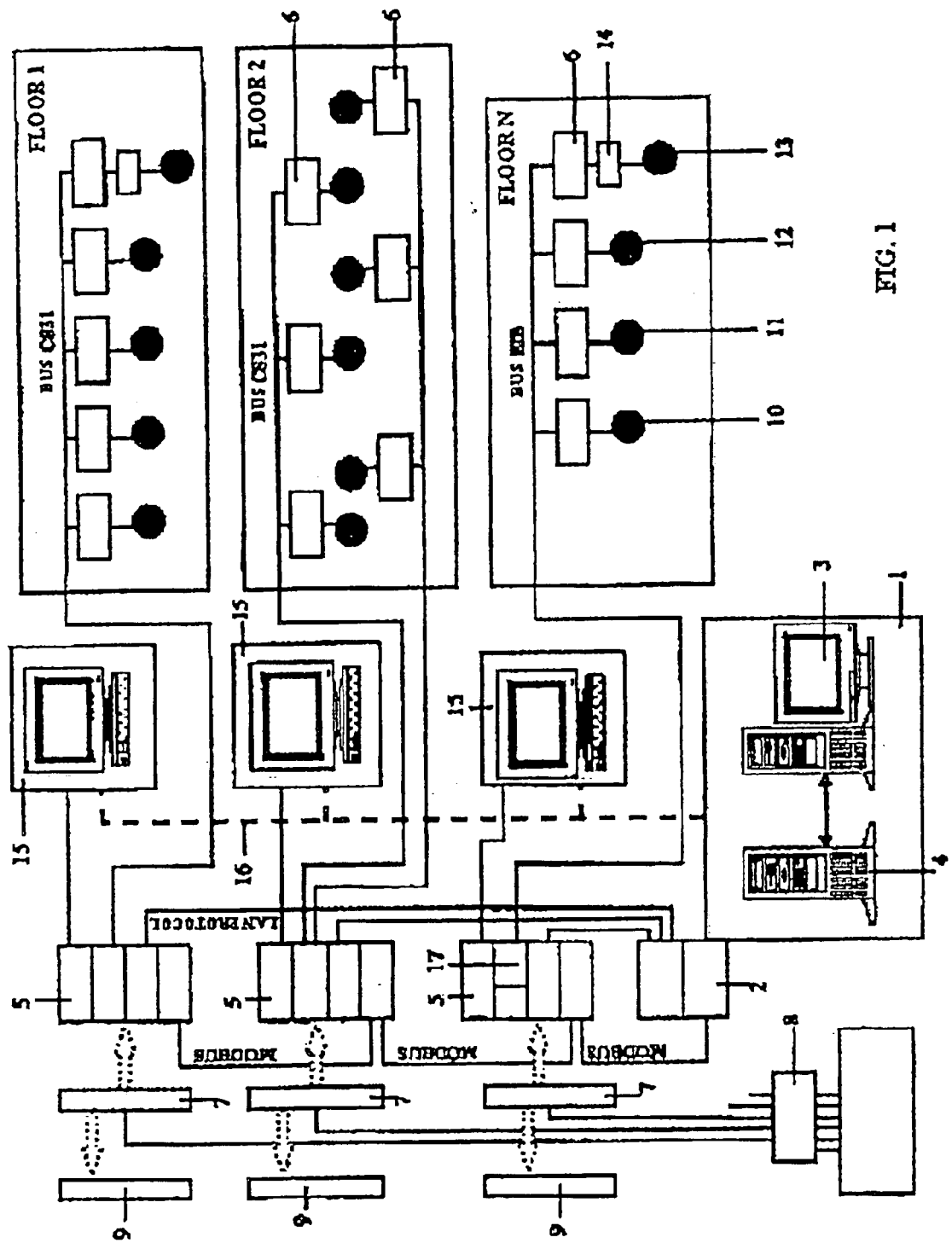
FIG. 1 is a block diagram of the structured system for monitoring and controlling the engineering equipment of an installation in the form of a building.

The present invention will be described in terms of a specific embodiment which, while not being the only possible embodiment, visually demonstrates the feasibility of achieving the requisite engineering result.

The structured system for monitoring and controlling the engineering equipment of an installation in the form of a building comprising several floors (FIG. 1) includes a central computer module 1 with an input-output device 2. The module is a programmable computer server station 3 having functions, according to the software, that provide for the centralized acquisition of monitoring data through information channels within a single network protocol, as well as for the processing of said data and for the output of control signals to the control devices of the units and apparatus of the engineering equipment in the building. The server station also includes a redundant server 4.

Used in the capacity of the programmable computer server station can be the station described in DE, No. 4125839, U.S. Pat. No. 5,684,374, or a station of the AlphaServer family manufactured by DIGITAL corporation (ref. the leaflet "AlphaServer Family" published by DIGITAL corporation).

Used as software having the required functionality is the Citect software package (ref. "Seize the Power" leaflet published in 1997 by Ci Technologies Pty Limited and devoted to Citect, version 5). Citect is a manager program with a differentiation of the levels of authority. The Citect software package is intended to provide a visual presentation of the object of automation. The program allows the operator to view the status and condition of all automated systems and apparatus in a dynamic mode and to produce control actions. The Citect package can also generate reports and output them to a printer to obtain said reports in hard copy at a preset time or at predetermined time intervals. The program includes a graphics editor which can be used to create images (video frames) on the computer monitor screen that will reflect the physical processes all which take place in the real objects of automation and which the operator must monitor. The program allows the operator to observe current values of the parameters being monitored and the condition of damaged and other objects, perform manual control functions, change control coefficients, etc. Control of the object of automation can be effected with the use of a computer mouse, a functional keyboard or a standard keyboard, or from a special control board.

The input-output device 2 of the central computer module has a plurality of controllers 5 connected thereto in a hierarchical-star (bus-star) circuit or in a bus (a bus-group) circuit. The function of the controllers is to support the process of data exchange and conversion of data from one protocol to another protocol. Each of the controllers has a plurality of remote input-output modules 6 connected thereto in a hierarchical-star circuit, while each of said modules is further connected to a corresponding monitoring and/or measuring and/or control sensor and/or control device for a specific unit or apparatus of the engineering equipment in the building. The controllers are placed at the points of location of communications hubs 7, which are connected in a hierarchical-star circuit to a central distribution frame 8 of the centralized power supply system and units 9 for off-line control of the engineering equipment (for details on connecting the equipment in a "hierarchical-star" circuit see the leaflet "AN&T SYSTIMAX®SCS. Recommendations on the Planning of Wiring of Copper and Optical Cables" by Lucent Technologies, 1996, page 3").

Used as the controller 5 can be the multi-channel controller described in U.S. Pat. No. 5,684,374 (Ref. No. 16) and known as "IMC S Class Compact", manufactured by Allen-Bradley company (US), or a controller of the AC 31 series manufactured by ABB concern (ref. ABB's leaflet "AC 31—A New Opening for Automation", 1998, pages 1 through 23). The same ABB leaflet describes remote input-output modules (controllers) that can be used as the remote input-output modules 6 within the scope of the present invention. These controllers have the hardware and software needed to organize the exchange of data with stand-alone systems having a serial interface.

The controllers 5 are joined into groups by a plurality of MODBUS buses (ref. earlier cited ABB leaflet, page 5) according to either a functional or a territorial principle. The total number of said buses depends on the number of ports available in the device that supports communication with the server. The remote input-output modules 6 are connected by means of bus CS 31BUS (ref. earlier cited ABB leaflet, pages 12 and 13) to so the corresponding controller 5 either serially or in a hierarchical-star circuit.

As applied to a building comprising several floors at each of which there are communications hubs of the centralized power supply system and units for off-line control of the engineering equipment located on the corresponding floor, the controllers are placed at the points of location of said communications hubs. This allows the monitoring and/or measuring and/or control sensors and control devices for the engineering equipment available on said floor to be connected on a floor-by-floor basis.

Used as monitoring sensors 10 and/or measuring sensors 11 are, respectively, level, flow, temperature, pressure, etc. sensors with the functionality, according to the design thereof, of passively registering and reflecting, in one form or another, the current value of a specific parameter.

Used as control sensors 12 are infrared sensors, photosensors and heat sensors belonging to the category of apparatus a change in the state whereof can be utilized as a control signal for switching some system or device on or off. In this case, said systems or devices are understood to include those from the plurality of known systems as, for example, a fire alarm system and an air conditioning or ventilation system responding to the signal of a dust sensor.

Control devices 13 are understood to include servo drives or other drives having the function of performing an action in response to a signal from a sensor. Said drives and servo drives can be represented by apparatus for controlling the position of blinds, devices for remote opening/closing of doors or on/off switching of lights.

Naturally, some of the sensors or devices used cannot, because of the design thereof, be connected to the network or to a remote input-output device directly. In such cases use is made of known network adapters or devices for transforming/converting analog signals to digital signals according to the protocol of the common network.

According to the present invention, each local engineering system which is a functionally independent section of the engineering equipment in the building and which includes units and apparatus of the lift equipment, or pump equipment, or heat supply station, or electric power supply system or ventilation equipment thereof, is a complete module capable of functioning both independently and as part of the claimed monitoring and control system. The modular structure ensures maximum flexibility and survivability of the system as a whole. Each module includes primary sensors and actuating devices, as well as devices 14 for matching the outputs of the primary sensors with the inputs of the controllers 5 or the remote input-output modules 6.

Connected to each of the controllers within the claimed monitoring and control system can be remote input-output devices with which the primary sensors or control devices associated with the units and apparatus in at least one functionally independent section of the engineering equipment in the building are linked.

To permit, according to the Citect software, local off-line monitoring and control of the units and apparatus in at least one functionally independent section of the active engineering equipment in the building, at least one additional computer station 15 is connected to a specific input of a specific controller. The station 15 has its input-output module linked via a dedicated channel with the corresponding controller, and is further connected through local area network 16 to the central computer module. This communication arrangement allows the operator of the central computer module to have part of the information transmitted to the station 15, and thus to enable the operator thereof to perform off-line monitoring of the functioning of the units and apparatus of the separate engineering equipment module.

The additional computer stations are arranged in a hierarchical-star circuit and can communicate with another over the information channel(s) through standard local area network hubs in the dedicated channels of the controllers 5.

Each functionally independent section or module of the engineering equipment in the building can be equipped with said stations 15.

The present system is designed so as to permit incorporation thereof into the network of already existing monitoring systems, such as those employing the EIB protocol standard (ref. the leaflet "ABB i-bus® EIB Intelligent Installation System. A Step into the Future" published by ABB concern, 1996, pages 4 to 7). To accomplish this, a converter 17 is interposed in the data lines of the EIB bus that provide a link to the corresponding controller 5. The function of said controller is to convert the data of one protocol into data of another protocol, for example the MODBUS.

In order to ensure stable functioning of the system regardless of any interruptions in the power supply and the stability thereof, it is expedient that the system be connected to a plurality of uninterrupted power supplies (not shown).

The central computer module can then be provided with the means for connecting it to an external global network to permit communication with other external monitoring and control systems. The Citect software package provides a remote monitoring capability based on the use of known hardware (ref. the leaflet "American Ref-Fuel" published by Ci Technologies Pty Limited, US, January 1998, page 8).

The present invention makes it possible, by altering the scheme of the monitoring and control system, to ensure full monitoring and control coverage of the entire equipment of the engineering systems and complexes regardless of the location thereof with respect to the central computer module while retaining the network throughput capacity and signal quality. The present system makes it possible to not only perform centralized gathering of information and exercise control from a common center, but also to have part of its functions transferred to the local stations that service functionally independent engineering complexes and systems, while retaining the capability of monitoring the functioning of said stations.

INDUSTRIAL APPLICABILITY

The present invention is industrially applicable, because it is based not on the use of any new means that permit implementation of monitoring and control functions, but rather on a new combination of the links between thereof. This makes it possible to ensure full monitoring and control coverage of the entire equipment of the engineering systems and complexes regardless of the location thereof with respect to the central computer module, while retaining the network throughput capacity and signal quality, as well as to build networks of any configurations depending on the application software.

We claim:

1. A structured system for monitoring and controlling engineering equipment units and apparatus of the engineering equipment in an installation, mainly a building comprising several floors, that includes a central computer module with an input-output device as well as a plurality of monitoring and/or measuring and/or control sensors and/or control devices for the engineering equipment units and apparatus of the engineering equipment in the building connected via communications hubs to a centralized power supply system having a central distribution frame and the engineering equipment units and apparatus of the engineering equipment for independent control of said equipment, said computer module comprising:

a programmable computer server station having functions, according to software that provide for a centralized acquisition of monitoring date through information channels within a single network protocol, as well as for a processing of said monitoring data and for outputting of control signals to control sensors or control devices for the engineering equipment units and apparatus of the engineering equipment in the building, wherein the structured system includes corresponding controllers placed at points of location of the communications hubs connected in a hierarchical-star circuit or a bus circuit to the central distribution frame of the centralized power supply system and units for off-line control of the engineering equipment, with the corresponding controllers further connected in a hierarchical-star circuit or a bus circuit to the input-output device of the central computer module, each of said corresponding controllers having a plurality of remote input-output modules connected serially or in said star circuit thereto, while each of said modules has a corresponding monitoring and/or measuring and/or control sensor and/or control device for each specific unit of the engineering equipment units or apparatus of the engineering equipment in the building connected thereto, and in that said engineering equipment units and apparatus of the engineering equipment includes at least one additional computer station linked through its input-output module via a local area network with the central computer module and, via a dedicated channel, the corresponding controller that ensures, according to the software, the local monitoring and the control of the engineering equipment units and apparatus of the engineering equipment in at least one functionally independent section of the engineering equipment in the building, and each of the at least one additional computer stations being connected with one another over an information channel in a hierarchical-star circuit via local area network hubs interposed in the dedicated channels.

2. A system according to claim 1, wherein each said controller has a plurality of said remote input-output modules connected thereto, the modules being linked to said sensors or control devices for the engineering equipment units and apparatus of the engineering equipment in at least one functionally independent section of the engineering equipment in the building.

3. A system according to claim 1 or claim 2, wherein the functionally independent section of the engineering equipment in the building is represented by the apparatus and units of the lift equipment, or pump equipment, or heat supply station, or electric power supply system of the building.

4. A system according to claim 1, wherein the sensors and control devices that put out information-carrying signals in a format other than the protocol of the common network are connected to the corresponding controller via a converter that converts data of one network protocol to data of another network protocol.

5. A system according to claim 1, wherein said communication hubs are connected to a plurality of uninterrupted power supplies.

6. A system according to claim 1, wherein level, flow, temperature and pressure sensors, respectively, are used therein as the monitoring and measuring sensors.

7. A system according to claim 1, wherein infrared sensors, photosensors, heat sensors are used therein as the control sensors.

8. A system according to claim 1, wherein the control devices are servo drives or drives having the function of performing an action in response to the signal from a sensor.

9. A system according to claim 8, wherein said drives and servo drives are apparatus for controlling the position of blinds and devices for remote opening/closing of doors or on/off switching of lights.

10. A system according to claim 1, wherein the central computer module is provided with means for connection thereof to an external global network to permit communication with other external monitoring and control systems.

11. A system according to claim 1, wherein the functionally independent section of the engineering equipment units in the building is represented by the apparatus and units of the lift equipment, or pump equipment, or heat supply system, or electric power supply system of the building.

12. A system according to claim 2, wherein the functionally independent section of the engineering equipment units in the building is represented by the apparatus and units of the lift equipment, or pump equipment, or heat supply system, or electric power supply system of the building.

* * * * *